Oct. 25, 1927.
A. SCHILLE
1,646,767
RODENT AND INSECT EXTERMINATOR
Filed May 17, 1927
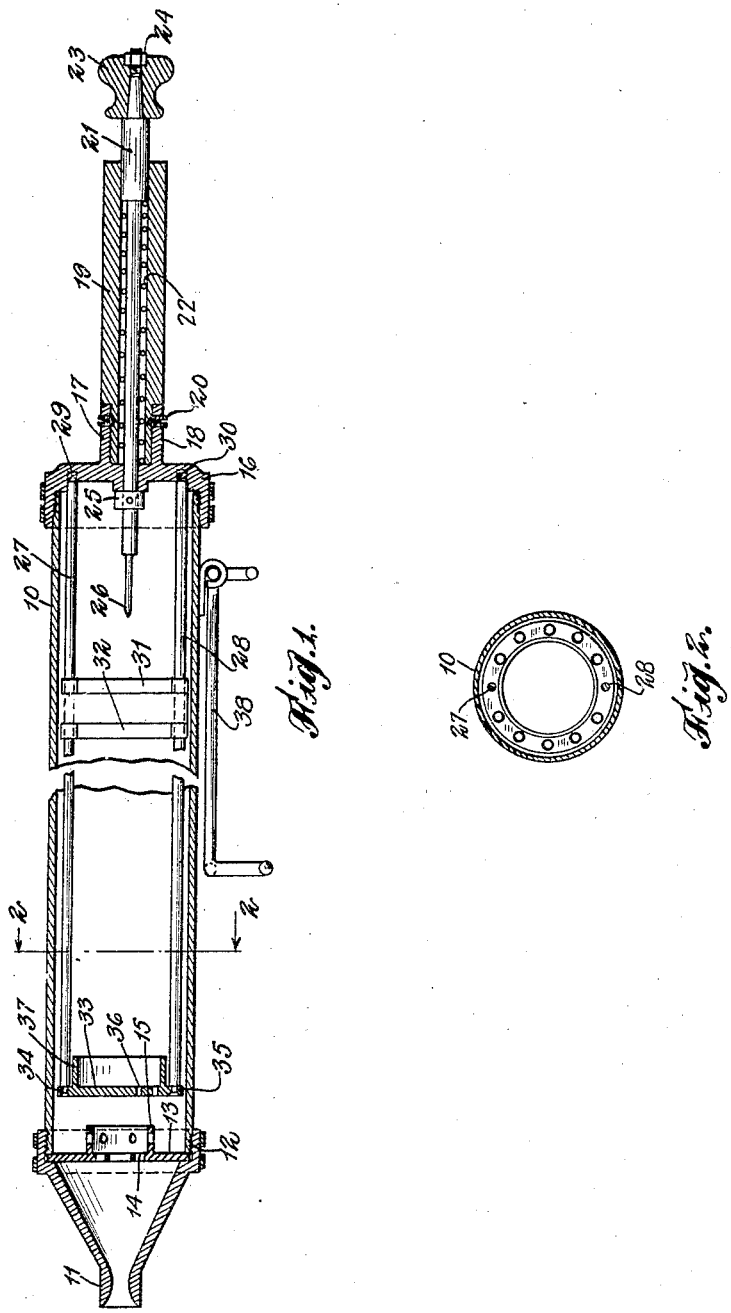
Andreas Schille Inventor
By his Attorney
George C. Heinitz Patented Oct. 25, 1927.

1,646,767

UNITED STATES PATENT OFFICE.

ANDREAS SCHILLE, OF MANNHEIM, GERMANY, ASSIGNOR OF FORTY PER CENT TO JAKOB WISSING, OF NEW YORK, N. Y.

RODENT AND INSECT EXTERMINATOR.

Application filed May 17, 1927. Serial No. 191,992.

This invention relates to improvements in devices for exterminating rodents, insects or the like by means of a gas adapted to be forced into the hiding places or abodes of these animals, and it is the principal object of my invention to provide a gas generating and distributing gun adapted to receive and exchangeably hold cartridges filled with a gas developing material adapted to be fired by means of a plunger which serves also the purpose of expelling the gas developed from the distributor or gun and forcing it into the hiding places of the rodents, such as field- and house-mice, rats, moles, gophers, hamsters, musk-rats, ground-wasps, termites, rabbits, hornets, locusts or the like, in order to destroy these animals as well as their brood.

Another object of my invention is the provision of a cartridge containing a specific material developing a gas upon being fired which is harmless for human beings, domestic animals and plants, but destructive to rodents, insects and the like, and which on account of its specific gravity penetrates deeply into the holes, crevices, hiding places and abodes of these animals.

A further object of my invention is the provision of a gas generating and spreading apparatus or device equipped with novel and improved means for holding a cartridge and with means for allowing a setting up of the apparatus at the places of its use in front of the holes to be gassed.

A still further object of my invention is the provision of a gas producing and dispensing gun for the destruction of pernicious rodents and insects or other animals, which is of a simple and inexpensive construction, readily transported, and yet durable and efficient in its operation.

These and other objects and advantages of my invention will become more fully known as the description thereof proceeds, and will then be specifically defined in the appended claims.

In the accompanying drawing forming a material part of this disclosure:

Figure 1 illustrates in sectional side elevation a gas gun or exterminator constructed according to my invention.

Figure 2 is a cross-section on line 2—2 of Figure 1.

As illustrated on the drawing, the device consists of a metal cylinder, preferably made of steel 10, having one of its ends closed by a cap 12, the extreme outer end of which is formed into a nipple 11, and which is adapted to be screwed upon the end of the cylinder 10, as indicated. This end of the cylinder is closed by a circular plate 13 having a plurality of openings 14, and a gas collecting, perforated hood 15.

The opposite end of the steel cylinder 10 is closed by a screw cap 16 having outer parallel and spaced prongs 17, 18 integrally made therewith between which the inner end of a handle 19 is secured by means of the screws 20 or the like. A plunger rod 21 works within the handle 19 and is surrounded therein by a spring 22 which tends to press the plunger rod outwardly. The outer end of the plunger rod extends beyond the handle end, and carries an operating knob 23 attached to the outer threaded end of rod 21 by means of a nut 24 or the like. The inner end of the plunger rod 21 extends through cap 16 and through a stuffing box 25 or the like held against the interior socket of the cap 16, and the extreme inner end of the rod is formed into a percussion pin or needle 26 adapted to engage and ignite the powder contained in the cartridge containing the gas developing material, and adapted to be introduced into the cylinder 10 upon the removal of cap 16 and parts connected thereto.

The cartridge contains a special material adapted to be exploded by means of the needle 26 and to develop thereupon a gas pernicious to rodents and insects of a specific gravity heavier than atmospheric air but harmless to human beings, domestic animals and plants.

The cartridge is held within the steel cylinder 10 by means of a specific holder consisting of substantially two parallel bars 27, 28 respectively screwed with one of their ends into cap 16, as at 29 and 30, and connected intermediate their ends by means of cross-rings or holders 31, 32, while the opposite ends of the bars 27, 28 are connected by means of a disc 33 or the like into which the ends of the bars are secured, as at 34, 35 respectively, and the disc has a plurality of openings 36 therein, and carries on its inner face a collecting hood 37.

A wire loop or frame 38 attached to the cylinder 10 allows a setting up of the gun in front of the holes to be gassed.

The operation of my device will be entirely clear from the above description, the cartridge holder is drawn out of the cylinder after unscrewing cap 16 and the cartridge is inserted into the holder and the same and cartridge are placed back into the cylinder and the cap 16 is screwed tight upon the cylinder end. After setting up the gun by means of the frame 38 in front of a mole hole or the like, the plunger is driven home by hitting the knob 23 driving the needle into the cartridge and exploding the same to develop the gas which is then expelled through openings 36 and 14 and the nipple 11 and forced into the holes of the animal abodes and penetrates deeply into the same exterminating the animals as well as their brood.

It will be understood that I have shown and described as an example the preferred form of my device only, and that I may make such changes as come within the scope of the appended claims without departure from the spirit of my invention.

Having thus described my invention, what I claim as new, and desire to secure by Letters Patent is:

1. A rodent and insect exterminator comprising a steel cylinder, a cartridge holder removably held therein, a handle, and a means guided by said handle to be driven into said cylinder for exploding the gas developing cartridge in said holder, means for allowing the exhaust of the gas developed from said exterminator into the abodes of the animals, and a means for supporting the exterminator in action.

2. A gun for gassing rodents and insects comprising a steel cylinder, screw caps closing both ends of said cylinder, one cap formed into a gas outlet nipple, a hollow handle secured to the other cap, a holder in said cylinder for an exploding gas developing cartridge, a means adapted to reciprocate in said handle, a needle connected to said means, to explode the cartridge, a means for normally keeping said handle enclosed means extending therefrom, means for allowing an exhaust of the gases developed and forcing of the same into the animal abodes, and a means for supporting the gun during action.

3. A device for exterminating rodents and pernicious insects by gas comprising a housing, a holder in said housing for an explosive gas developing cartridge therein, a screw cap for closing one end of said housing to which said holder is secured, a hollow handle, means for securing said handle to said cap, a plunger within said handle projecting at both of its ends beyond the same, a percussion needle at the inner end of said plunger for exploding the cartridge when said plunger is driven home to develop the gas, a spring surrounding said plunger within said handle, a knob at the outer end of said plunger rod spaced from said handle, a nipple at the end of the cylinder opposite to the handle thereof, perforated discs on said holder and cylinder for allowing the exhaust of the gases through said nipple and gas collectors on the inner faces of said discs.

Signed at Mannheim, Badenia, Germany this 3rd day of May, A. D. 1927.

ANDREAS SCHILLE.